United States Patent

Sasaki et al.

Patent Number: 5,736,255
Date of Patent: Apr. 7, 1998

[54] ALUMINUM PHOSPHATE/SILICON DIOXIDE-BASED SEALING MATERIAL

[75] Inventors: Satoshi Sasaki; Hideo Nitta, both of Saitama-ken, Japan

[73] Assignee: Praxair S.T. Technology, Inc., Danbury, Conn.

[21] Appl. No.: 142,017

[22] Filed: Oct. 28, 1993

[51] Int. Cl.⁶ .................................................. B32B 17/00

[52] U.S. Cl. .................... 428/469; 428/470; 428/472; 428/472.2; 428/472.3; 106/14.12; 106/286.5; 106/286.8; 106/287.17; 106/287.34

[58] Field of Search ................... 106/14.05, 14.12, 106/286.5, 286.8, 287.17, 287.34; 428/469, 470, 471, 472, 472.2, 472.3

[56] References Cited

U.S. PATENT DOCUMENTS

| | | | |
|---|---|---|---|
| 3,948,786 | 4/1976 | Evans | 106/286.5 |
| 4,367,101 | 1/1983 | Haselkorn | 106/286.5 |
| 4,504,527 | 3/1985 | Hara | 428/471 |
| 4,638,157 | 1/1987 | Mosser | 106/14.12 |
| 4,680,239 | 7/1987 | Yano | 428/472 |
| 4,758,281 | 7/1988 | Eckler | 106/14.12 |
| 4,828,796 | 5/1989 | Shishkin | 106/14.12 |
| 5,202,175 | 4/1993 | Paz-Pujalt | 428/469 |

*Primary Examiner*—Timothy Speer
*Attorney, Agent, or Firm*—Robert J. Feltovic

[57] ABSTRACT

A sealing material having excellent resistance to attack by molten metals, such as molten zinc, comprising aluminum phosphate/silicon dioxide-based material. The invention also relates to a method for coating articles with such sealing material.

5 Claims, 2 Drawing Sheets

ALUMINUM PHOSPHATE/SILICON DIOXIDE-BASED SEALING MATERIAL

FIELD OF THE INVENTION

The invention relates to a sealing material to be mainly applied on components used in hot-dip zinc plating line, said sealing material having an excellent resistance to attack by molten metal, specially molten zinc, and also relates to its manufacturing method.

BACKGROUND OF THE INVENTION

Molten zinc can easily penetrate into micro gaps, in the micrometer size range, since molten zinc has low viscosity and low surface tension. Therefore, some protecting methods are proposed or have been used to improve the property of materials such as specially developed steels (Japanese Patent Laid Open NO. S56-112447) and applying special thermally sprayed coating such as WC-Co coatings (Japanese Patent Laid Open NO. H1-225761). However, molten zinc resistant steels are basically iron base alloys and do not have enough resistant to molten zinc attack. Besides the cost of these alloys are much higher than normal structural steels. Mainly self fluxing alloys and WC-Co coating are used for thermally sprayed coatings to protect the substrate from the attack but the sufficient resistance has not been achieved due to the permeation of molten zinc through inter connected porosity and selective attack on the metal binders in the coatings. Even in the case of materials resistant to molten zinc, such as MoB disclosed in Patent Laid Open No. H4-148211, which are used as a thermally sprayed layer, zinc may mechanically stick to the rough surface and porosity of the coating.

It is well known that sealing the coated surface by water glass or colloidal silica (silicon dioxide) is effective to improve the resistance of a thermally sprayed coating to attack of molten zinc. However, the durability of these sealing materials are not sufficient and a thick thermally sprayed undercoat having excellent durability is generally required.

The invention is to solve the above mentioned problems, that is, to provide a method for improving resistance to molten zinc attack and anti-wettability of generally used structural materials and/or the thermally sprayed coatings and the materials so produced.

SUMMARY OF THE INVENTION

The invention relates to the use of aluminum phosphate as a sealing material which has better durability than conventionally used water glass and colloidal silica and it has been found that a good sealing material can be obtained by heat treating a mixed aqueous solution containing colloidal silicon dioxide and aluminum phosphate after applying it to components to be sealed.

It has been found that a sealing material having an excellent resistance to attack by molten zinc would comprise 15 to 50 wt. % or favorably 30 to 50 wt. %, silicon dioxide and balance aluminum phosphate with normal impurities.

The invention also relates to a method for forming the sealing material described above which comprises the steps of:

(a) formulating a mixed aqueous solution containing colloidal silicon dioxide and aluminum phosphate (Al(PO$_3$)$_3$) as an original material;

(b) applying the solution on the surface of a component to be sealed; and (c) heat treating the component coated with the solution at 200° to 600° C. for a time period sufficient to solidify the sealant.

Aluminum phosphate [Al(PO$_3$)$_3$] has better structural durability than silicon dioxide at temperature of oven 400° C. and has better compatibility with thermal expansion of the metal made substrate and less wettability with molten metals such as zinc and aluminum. However, during the forming of the sealing material, an aqueous solution containing only [Al(PO$_3$)$_3$] bubbles up when the solution is heat treated. Therefore the sealing material should contain 15 to 50 wt. %, or favorably 30 to 50 wt. % of silicon dioxide preferably of which the original material is colloidal silica in the solution.

Since water contained in the solution will not evaporate enough below 200° C. so that the film of the sealing material will crack when it is heated up to melting point of the zinc bath during normal operation, and since oxidation of the substrate or the thermally sprayed coating will take place over 600° C., then the heat treatment is maintained within a range of 200° to 600° C.

BRIEF DESCRIPTION OF THE INVENTION

Figure 1:
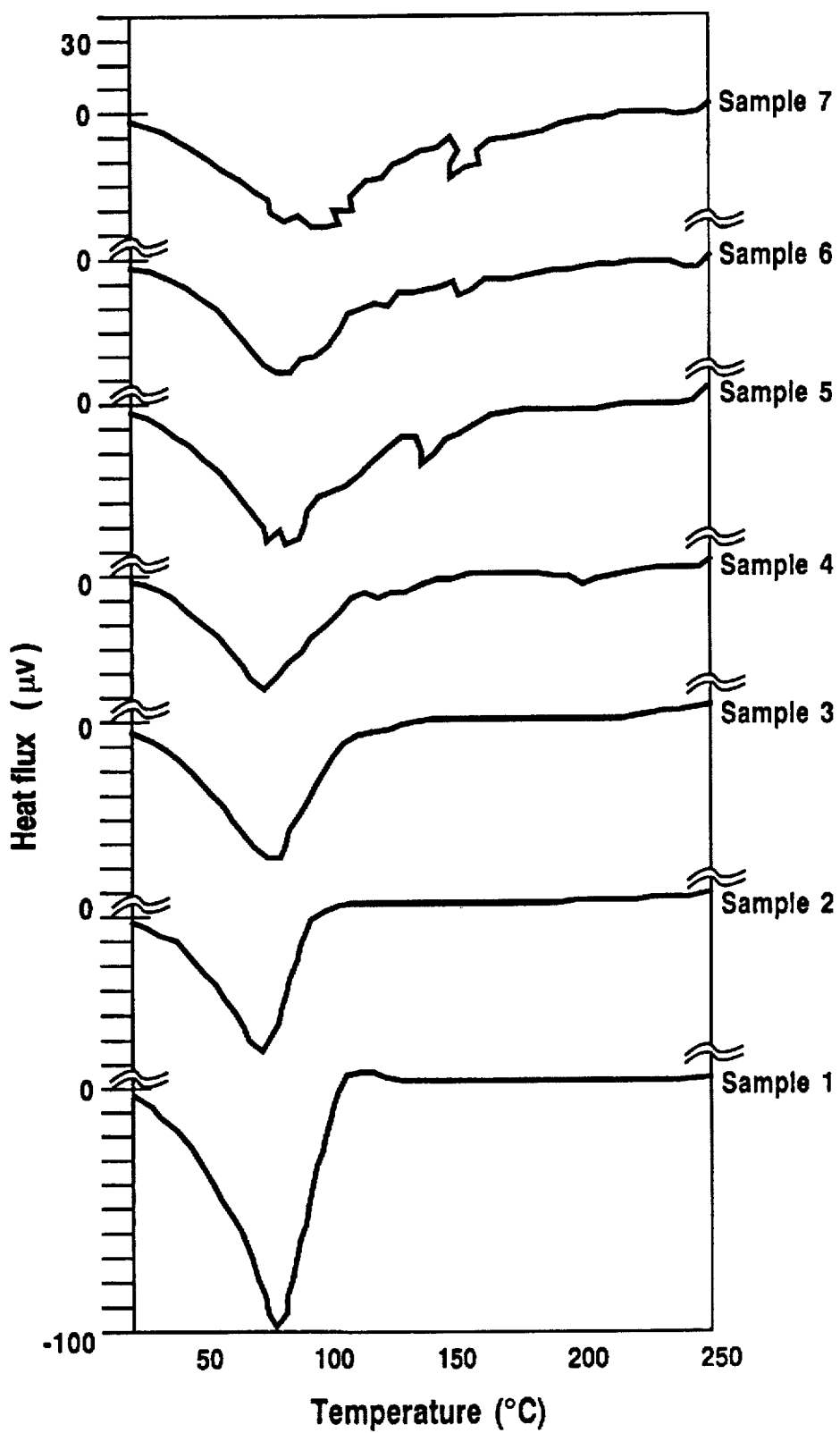
FIG. 1 shows endothermic curves during the first dehydration (primary boiling) measured by DTA for each solution of a sealing material that is shown in Table 1.
Figure 2:
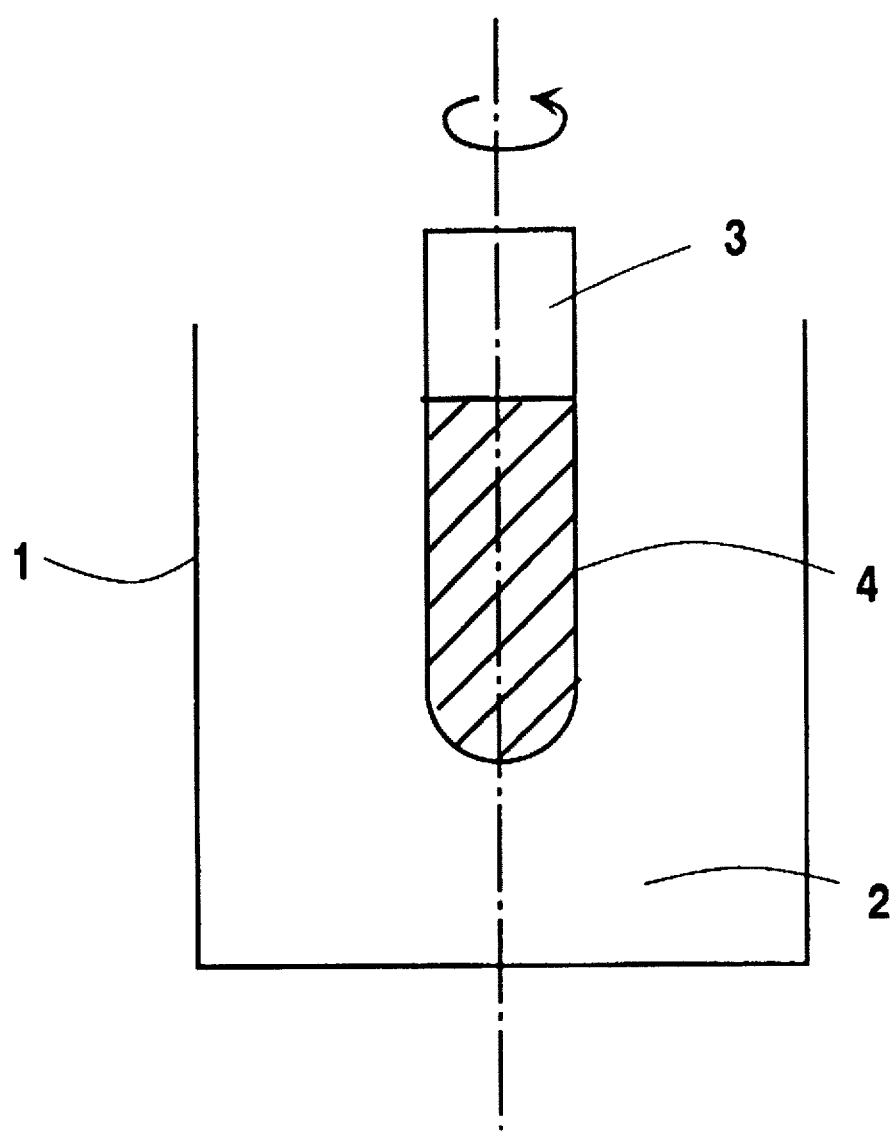
FIG. 2 shows a schematic of a molten zinc immersion test in which bar samples with the sealants shown in Table 1 are used. All samples are heat treated at 450° C.

The following explanations are made by referring to FIGS. 1 and 2. The result indicates that the curves of solution 5, 6 and 7 fluctuate at 75° to 160° C. It represents foaming or blowing of the sealant. Aluminum phosphate itself foams during heating which can cause detrimental effect to the sealant film. The addition of colloidal silicon dioxide to the solution restrains the foaming.

TABLE 1

| Sealing Material | Content of Sealing Used Wt. % | | Solution | | | | |
|---|---|---|---|---|---|---|---|
| | | | No. Refer to Fig. 1 | Contents Wt. % | | | |
| | SiO$_2$ | Al(PO$_3$)$_3$ | | Al(PO$_3$)$_3$ | Colloidal Silica | Water | Foaming |
| Comparison | 100 | 0 | 1 | 0 | 20 | 80 | No |
| Example 1 | 78 | 22 | 2 | 5 | 18 | 77 | No |
| Example 2 | 48 | 52 | 3 | 15 | 14 | 71 | No |
| Example 3 | 29 | 71 | 4 | 25 | 10 | 65 | Little |
| Example 4 | 15 | 85 | 5 | 35 | 6 | 59 | Yes |

TABLE 1-continued

| Sealing Material | Content of Sealing Used Wt. % SiO$_2$ | Al(PO$_3$)$_3$ | Solution No. Refer to Fig. 1 | Contents Wt. % Al(PO$_3$)$_3$ | Colloidal Silica | Water | Foaming |
|---|---|---|---|---|---|---|---|
| Example 5 | 4 | 96 | 6 | 45 | 2 | 53 | Yes |
| Example 6 | 0 | 100 | 7 | 50 | 0 | 50 | Yes |

Table 2 shows results of the immersion test as shown in FIG. 2 to evaluate durability of the sealants formed by various condition of the solutions. Specifically, a sample substrate 3 is coated with a sealant layer 4 and immersed in a molten zinc bath 2 contained in a pot furnace 1. The temperature of the molten zinc bath was 450° C.

TABLE 2

| Sealing Material | Solution Number | Contents of Sealing Material wt. % SiO$_2$ | Al(PO$_3$)$_3$ | Na$_2$SiO$_2$ | Immersion Test Results Duration Time (Hours) 100 | 200 | 300 | 400 | 500 | 600 | 700 | 800 | 900 | 1000 |
|---|---|---|---|---|---|---|---|---|---|---|---|---|---|---|
| Comparison 1 | 1 | 100 | 0 | 0 | A | A | B | B | C | C | D | D | E | — |
| Comparison 2 | 2 | 78 | 22 | — | A | A | A | A | B | B | C | C | D | — |
| Example 1 | 3 | 48 | 52 | — | A | A | A | A | A | A | A | A | B | B |
| Example 2 | 4 | 29 | 71 | — | A | A | A | A | A | A | A | A | A | A |
| Example 3 | 5 | 15 | 85 | — | A | A | A | A | A | A | A | A | A | A |
| Comparison 3 | 6 | 4 | 96 | — | A | A | A | A | B | B | B | C | C | C |
| Comparison 4 | 7 | 0 | 100 | — | A | A | B | B | C | C | C | C | D | D |
| Comparison 5 (water glass) | — | — | — | 100 | B | C | E | — | — | — | — | — | — | — |

A: No damage.
B: Cracks with very small defects.
C: Larger defects with no damage on the substrate.
D: The substrate is partially exposed and zinc strongly adhere to the exposed surface of the substrate.
E: Zinc strongly adheres all over the surface of the substrate and it is hard to remove it.
A, B and C are acceptable for practical use.

What is claimed is:

1. Sealing material having good resistance to attack by molten metal comprising 15 to 50 wt. % coloidal silicon dioxide and 50 to 85 wt. % aluminum metaphosphate with normal impurities.

2. The sealing material described in claim 1 containing 30 to 50 wt. % silicon dioxide and 50 to 70 wt. % aluminum phosphate.

3. The sealing material described in claim 1 wherein said molten metal is molten zinc.

4. The sealing material described in claim 2 wherein said molten metal is molten zinc.

5. A metal article resistant to attack by molten metal having a layer on its surface which comprises 15 to 50 wt. % silicon dioxide and 50 to 85 wt. % aluminum phosphate with normal impurities.

* * * * *